March 19, 1929.  A. S. CAMPBELL  1,706,106
BODY CONSTRUCTION FOR VEHICLES
Filed Oct. 5, 1926  2 Sheets-Sheet 1
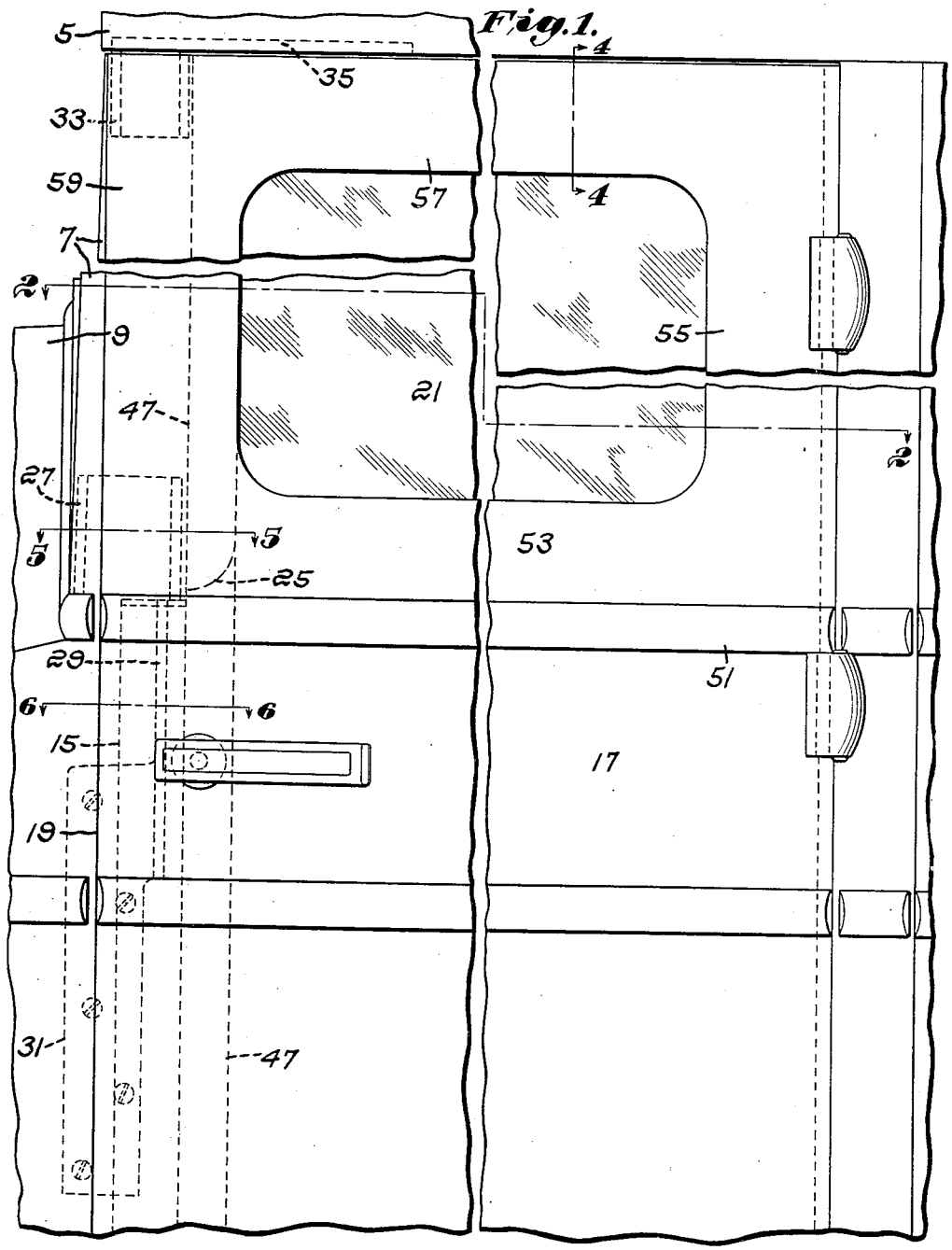
Inventor:
Alphonso S. Campbell,
by Emery, Booth, Janney & Varney
Attys.

March 19, 1929.                A. S. CAMPBELL                1,706,106
                       BODY CONSTRUCTION FOR VEHICLES
                       Filed Oct. 5, 1926          2 Sheets-Sheet 2
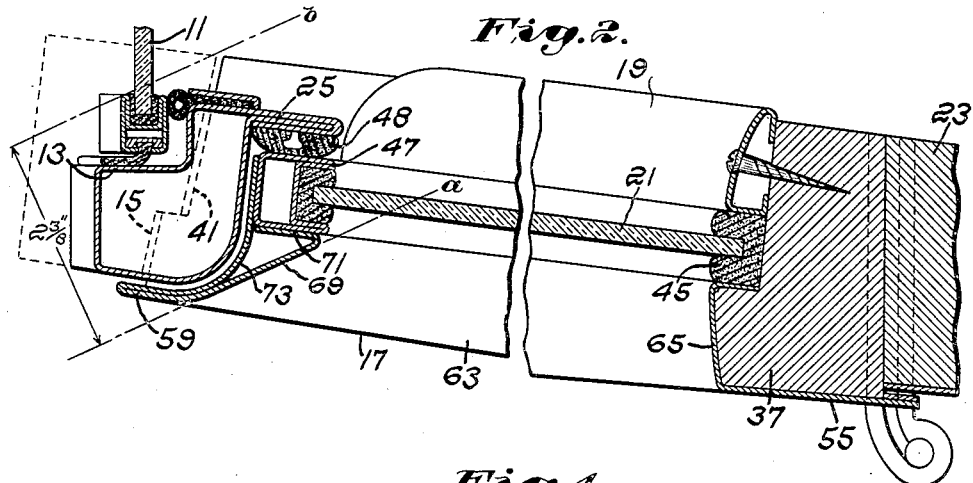
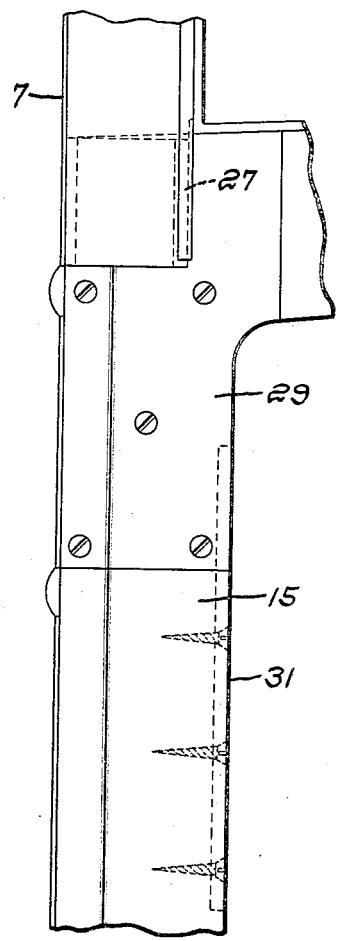
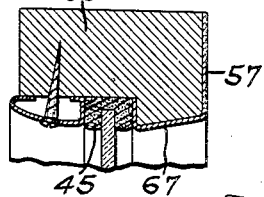
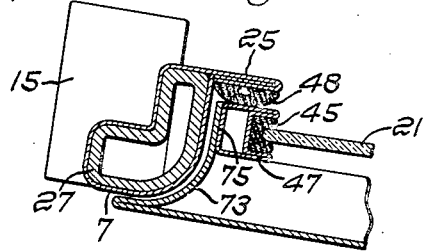
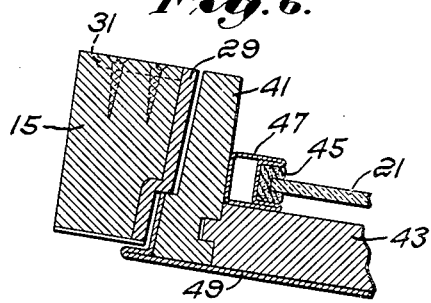
Inventor:
Alphonso S. Campbell,
by Emery, Booth, Janney & Varney
Attys.

Patented Mar. 19, 1929.

1,706,106

UNITED STATES PATENT OFFICE.

ALPHONSO S. CAMPBELL, OF WINCHESTER, MASSACHUSETTS, ASSIGNOR TO A. S. CAMPBELL COMPANY, OF EAST BOSTON, MASSACHUSETTS, A CORPORATION OF MASSACHUSETTS.

BODY CONSTRUCTION FOR VEHICLES.

Application filed October 5, 1926. Serial No. 139,618.

This invention relates to automotive vehicles and the primary object is to provide a construction of vehicle having an enclosed driver's seat and a door adjacent the cowl to provide access to the driver's seat within the enclosure, which construction will afford good vision to the driver. In particular the construction may be built, in accordance with the principle described by William H. Emond in his application Serial No. 41,076, filed July 2, 1925, so that the opaque portions in the field of the driver's vision are not greater in apparent transverse dimension than the normal interpupillary distance between the eyes, whereby there is in effect no real obstruction. The construction may also embody the principles of the Emond Patents 1,570,560, dated June 19, 1926, and 1,592,657, dated July 13, 1926, but it provides for an application thereof having a different outward appearance and style effect than the specific embodiment illustrated in those patents and in particular provides a vehicle body in which the parts of the door appear to have the bulk ordinarily associated in the mind with such structures but wherein the disadvantages of the customary bulky construction are done away with.

My invention, while not limited thereto, finds a particular application to the construction of so-called composite bodies and for the purposes of the present disclosure I have illustrated a body of composite construction and have illustrated the left hand forward door since the left hand corner assembly is nearer to the eyes of the driver than the right hand one and is that which in ordinary constructions provides the greater obstruction to vision. My invention will be well understood by reference to the following description of the single embodiment thereof shown by way of example in the accompanying drawings, wherein:

Fig. 1 is a side elevation of the left hand forward door of a closed vehicle and adjacent portions of the door case, with parts broken away;

Fig. 2 is a section on the line 2—2 of Fig. 1 on a slightly larger scale;

Fig. 3 is an elevation of a portion of the forward jamb of the door case, as seen from the rear, on the same scale as Fig. 1; and Figs. 4, 5 and 6 are sections on the correspondingly numbered lines of Fig. 1.

As an example of my invention I have herein illustrated its embodiment in a permanently closed vehicle body of the type wherein permanent posts arising from the belt line of the vehicle support the roof or top 5 and may comprise corner posts 7 adjacent the cowl 9, between which corner posts (see Fig. 2) may extend the wind-shield 11, the edges of the latter being received in suitable rabbets 13 in the forward faces of the posts 7. The lower body section of the vehicle, that is, the portion below the belt line, may provide for a door opening adjacent the cowl giving access to the driver's seat within the vehicle and the post 7 arising at the side of this opening forms a portion of the door jamb, the lower portion of which is herein provided by the jamb pillar 15 forming a portion of the framing of the vehicle body. The opening in the lower body section is closed by the lower body portion 17 of a tall door of the type having a sliding window and extending from sill to roof, the upper portion of the door above the belt line being a window frame 19 receiving a sliding glazing 21 and closing against the post 7. The rear of the door is herein shown as the hinge side and it is hinged to a jamb 23 forming a portion of the framing of the body and which may extend from sill to roof, the upper portion of this jamb forming one of the posts supporting the roof 5. The forward post 7 against which the window frame closes may, as best shown in Fig. 2, be formed of a suitable steel stamping of generally tubular form having a flange 25 defining a rabbet into which the frame 19 closes. The transverse surface of the rabbet may, as herein shown, be offset rearwardly from the jamb line of the upright 15 of the lower door body as is consistent with the construction of the door which I am about to describe and I have herein shown the posts 7 as mounted substantially in the manner disclosed in the application of Raymond Calpin, Serial No. 129,127, filed August 14, 1926, the hollow post fitting over and being brazed to the hollow shape 27 formed on the upper portion of an anchor member having flanges 29 and 31 which embrace the rear and inner sides of the upright 15 and are screwed thereto. The upper end of the post 7 may be secured by an anchor comprising a hollow cup-shaped stamping 33 (Fig. 1) fitting into and brazed to the upper end of the post and having suitable flanges as 35 which may be screwed to the frame members of the roof.

Referring now to the construction of the door itself, the door herein shown is of composite construction and except for the forward portion thereof above the belt line, that is to say, the forward portion of the window frame 19, may resemble in its framing the ordinary composite door and may embody (see Figs. 2, 4 and 6) a rear wooden pillar 37 extending from sill to roof and a wooden top rail 39. The front pillar 41, which may likewise be of wood, is herein shown as terminating substantially at the belt line and may be joined adjacent its upper end to the pillar 37 by the usual belt bar 43. The rear pillar 37 and the top rail 39 provide grooves or guideways as illustrated to receive the edges of the glazing 21, these grooves being herein shown as lined with the customary felt packing 45. The portion of the forward pillar of the door about the belt line, that is, the forward upright of the window frame, is reduced in dimensions both fore and aft and transversely as compared with the pillar 41 and herein is shown as a metal member 47 carried by pillar 41 and which takes the form of a hollow box having flanges projecting to form a channel guide for the glazing. The thickness of this upright, that is, the distance between the flanges of the channel, closely adapts it to the thickness of the glazing 21, taking into account the packing 45, and it is of restricted dimension fore and aft. The channel, when as here it is formed from a member separate from the relatively heavy pillar below the belt line from which it rises, may, if desired, be continuous from the roof to a point considerably below the belt line (see Fig. 1), the lower portion of the channel and of the opposed guideway in the pillar 37 providing a berth between the pillars of the door to receive the glazing in its lowered position. As seen in Fig. 2, the channeled upright 47 may close directly into the rabbet of the post 7, herein against a suitable gasket 48 provided on flange 25.

A door constructed as described provides, as compared with the ordinary vehicle door having continuous door pillars of substantially uniform section from sill to roof, for the reduction in size in two dimensions of the upper forward portion of the frame which lies in the line of vision and in particular such forward upright and the corner post with which it cooperates may be so constructed as collectively to present a transverse dimension not greater than the distance between the eyes, as described in Emond application already referred to. This distance is about 2½ inches and I have marked on Fig. 2 the dimension 2⅜ inches as an example of a desirable construction. As there shown, it will be seen that the corner assembly including the post 7 and the adjacent opaque parts of the window frame and wind-shield frame may be organized in a transverse dimension not greater than 2⅜ inches, at least at the elevation of the eyes at which they ordinarily look past the post. The eyes of the driver are directed toward the corner post at an angle of about 30° and it will be seen by the bounding lines a and b marked that the apparent width of the obstruction is determined by the outer rear edge of the forward upright of the window frame and by a surface at the inner side of the post, herein the forward edge of the window frame, and that the line of sight a diverges outwardly from the side of the body. It will be clear from inspection of Fig. 2 that any portions of the assembly located generally at the outer side of the vehicle and forward of the outer rear corner of the frame and lying within the line of sight a have no effect on the apparent transverse dimension of the obstruction. I take advantage of this to provide for a door and corner post having much the appearance of the customary but objectionably bulky doors and in which the forward portion of the door and the corner post when seen from practically any point of view except that of the driver appear substantial and bulky but which are as a matter of fact not objectionably bulky as viewed from the driver's seat, but which may on the contrary, if desired, be reduced to an apparent width from that point of view of less than the normal distance between the eyes.

Consistently with this purpose I have shown the post 7 as carried outwardly so that its outer face may represent substantially a continuation of the surface of the lower body section from which it rises and, to provide for greater apparent bulk than seen from the side, I have herein shown the post carried forward so that the wind-shield rabbet 13 is deeper than would be required merely to house the wind-shield frame obviously, however, without carrying the post across the line of sight b which extends past the outer forward edge of such frame.

To provide a door of uniform exterior appearance and to dissimulate the slender upright 47 the upper portion of the door may be completed by a sheet metal covering preferably in the form of a unitary stamping and which even may be in one piece with the panel 49 which defines the outer face of the lower door body or, if a separate stamping, disposed so that its face forms an apparent continuation of the face of such panel, the meeting edges in such case being concealed by the molding 51 (Fig. 1). This covering is of a generally frame-like form and may comprise a lower cross portion 53, a rear portion 55 covering, as shown in Fig.

2, the outer face of the pillar 37, a top piece 57 covering, as shown in Fig. 4, the outer face of the top rail 39, and a forward portion 59 lying outwardly of upright 47. The faces of these parts all lie in a surface which is substantially a continuation of the outer face of the lower door body formed by the panel 49. The rear edge of the part 55 and the forward edge of the part 59 may align with the corresponding edges of the lower door body, as seen in Fig. 1, the part 59 herein overlying the supporting post 7 in the manner of a flange and concealing from the exterior the joint between the lower door pillar 41 and its jamb 15 on the one hand and between the upright 47 and the post 7 on the other hand so that so far as seen from the exterior, as indicated by the full lines in Fig. 1, there is no break in the generally vertical lines of the door and no substantial asymmetry in the construction.

The inner edges of the parts of the frame referred to may be flanged inwardly substantially to the plane of the glazing, the part 53 (see Fig. 2) to form a sill 63, the part 55 at 65 to cover the pillar 37 where it forms the reveal of the window frame, the part 57 (see Fig. 4) similarly at 67 to cover the corresponding reveal at the top rail 39. The part 59 is provided with a similar flange 69 which extends substantially to the outer rear edge of the channel 47, the metal being herein shown as terminally flanged forwardly at 71 and welded to the outer flange of the member 47. As illustrated in Fig. 2, the flange 69 is so formed that it lies entirely within the line of sight $a$ past the rear outer edge of the upright 47 so that as far as the vision of the driver past the corner assembly is concerned it is without effect and the vision is equally as good as if solely the member 47 were present. As seen from the exterior, however, the slight width fore and aft of the upright is dissimulated as the forward upright of the closed door appears to be of a width equal to the distance between the forward edge of part 59 and the rear edge of the channel. Furthermore, the face 59 being a continuation of the surface of the lower door body and its forward edge aligning with the forward edge of the lower door body, the offset between the upper portion of the jamb formed by the post 7 and the lower portion formed by the frame element 15 is dissimulated and the door has the appearance of one having a uniform forward pillar.

The part 59 may be supported at its outer edge and herein the metal is shown as integrally extended, the extension 73 being bent back to form a double thickness overlying pillar 7 and continued inwardly and welded at 75 to the web of the channel member 47. This portion 73 forms the forward edge of the upper portion of the door and it corresponds in form to the transverse face of the rabbet in post 7 and to the outer face of the post, a suitable clearance being provided as is customary in such work. The outer rear edge of the post 7 is rounded off as indicated in Figs. 2 and 5, this providing among other things for giving a considerable transverse thickness to post 7 to bring its outer face flush with the outer face of the body while keeping the face of flange 69 inward of the line of sight $a$.

It has been my intention so far as possible to use herein the word "face" as applying to the extended boundary or superficial area of some physical object and to use the word "surface" in the sense of an imaginary surface, usually one in which a face or faces lie. That is, the word "surface" is used in a geometrical sense analogously to the word "plane" but to include surfaces not necessarily nor usually geometrically plane surfaces. Also, I have generally used the words "inner", "outer", "front" and "rear" with reference to the vehicle as a whole.

I have described in detail the particular embodiment of my invention shown by way of example in the accompanying drawings. It will be clear, however, that the construction may be widely varied without departing from the principles exemplified by the single disclosure herein given. What I claim as new and desire to secure by Letters Patent I shall express in the following claims.

Claims:

1. A door for a closed vehicle of the type wherein the upper portion of the door above the belt line is a frame receiving a sliding glazing, said door comprising a rear pillar extending from sill to roof, a forward pillar terminating substantially at the belt line, a guide for the forward edge of the glazing rising from said forward pillar closely approximating in thickness the thickness of the window guided therein and of slight width fore and aft and a unitary covering sheet for the upper portion of the door having a part overlying the upper portion of the rear pillar, an upper cross or lintel portion and a part extending diagonally from the rear edge of said guide outwardly to a continuation of the surface of the lower door body.

2. A door for a closed vehicle of the type wherein the upper portion of the door above the belt line is a frame receiving a sliding glazing, said door comprising a rear pillar extending from sill to roof, a forward pillar terminating substantially at the belt line, a guide for the forward edge of the glazing rising from said forward pillar and inset from the forward and outer faces thereof, a sheet metal covering for the outer face of the door comprising a panel covering the lower part of the door and a frame-like portion for the upper part of the door comprising a covering for the rear pillar and top rail and a portion outward of said guide, extending diagonally from the rear outer end thereof to a surface constituting a continuation of said panel and terminating in a flange lying in said surface and having its forward edge aligned with the forward edge of the panel.

3. A composite door comprising a rear wooden pillar extending from sill to roof and providing a guideway for a window, a wooden top rail, a wooden forward pillar terminating substantially at the belt line, a metal window guide extending between said forward pillar and the top rail aligning with the guideway in the rear pillar and having an outer flange lying closely adjacent the outer face of the window and a sheet metal panel providing a covering for the upper portion of the pillar and for the top rail and having a portion extending from the rear edge of said outer flange diagonally outward and forward to the surface defined by the outer faces of the rear pillar and top rail.

4. A vehicle of the closed type having an enclosed driver's seat and comprising a lower body section having a door opening providing access to said seat and a fixed upper section including a top-supporting post rising adjacent the cowl at the forward side of the opening, a door of the type having a sliding window and comprising a lower door body received in said opening and providing within the same a berth for the window in lowered position and an upper portion above the belt line forming a fixedly projecting window frame into which the window slides when raised from said berth, the forward upright of the frame comprising a flange substantially coplanar with the inner side thereof to cooperate with the inner face of the window and a flange cooperating with the outer face of the window, said upright closing directly against said post and a covering of sheet metal comprising forward, rear and top marginal portions lying in a surface which is a continuation of the outer face of the door body and flanged inwardly substantially to the plane of the glass and along the forward side to provide a face lying inwardly of the line of sight from the driver's seat and extending substantially to the rear edge of said outer flange.

5. A vehicle of the closed type having an enclosed driver's seat and comprising a lower body section having a door opening providing access to said seat and a fixed upper section including a top-supporting post rising adjacent the cowl at the forward side of the opening, a door of the type having a sliding window and comprising a lower door body received in said opening and providing within the same a berth for the window in lowered position and an upper portion above the belt line forming a fixedly projecting window frame into which the window slides when raised from said berth, the forward upright of the frame comprising a flange substantially coplanar with the inner side thereof to cooperate with the inner face of the window and a flange cooperating with the outer face of the window, said upright closing directly against said post and a covering of sheet metal comprising forward, rear and top marginal portions lying in a surface which is a continuation of the outer face of the door body and flanged inwardly substantially to the plane of the glass and along the forward side to provide a face lying inwardly of the line of sight from the driver's seat and extending substantially to the rear edge of said outer flange, the edges of the forward and rear marginal portions aligning substantially with the forward and rear edges of the lower door body respectively.

6. A vehicle of the closed type having an enclosed driver's seat and comprising a lower body section having a door opening providing access to said seat and a fixed upper section including a top-supporting post rising adjacent the cowl at the forward side of said opening, a door of the type having a sliding window and comprising a lower door body received in said opening and providing within the same a berth for the window in lowered position and an upper portion above the belt line forming a fixedly projecting window frame into which the window slides when raised from said berth, said body comprising pillars at the sides and a connecting panel, one of said pillars terminating substantially at the belt line, the corresponding upright of said frame closing against said post and comprising the projecting portion of a channeled member having its lower end mounted in said pillar inwardly from the outer face of said body and its upper end connected to the lintel of the frame and providing a guide within which the window slides between its extreme positions and being of a thickness closely adapting it to the window and of restricted dimension fore and aft and a covering for said frame constituting generally a continuation of the surface of said panel and providing coverings for the rear upright and top rail of the frame and a portion lying outward of the face of said member above the belt line inwardly of the line of vision past the rear of said member and extending substantially to a surface constituting a continuation of the outer face of said body and having a forward edge in alignment with the forward edge thereof.

7. A vehicle of the closed type having an enclosed driver's seat and comprising a lower body section having a door opening providing access to said seat and a fixed upper section including a top-supporting post rising adjacent the cowl at the forward side of the opening, a door of the type having a sliding window and comprising a lower door body received in said opening and providing within the same a berth for the window in lowered position and an upper portion above the belt line forming a fixedly projecting window frame into which the window slides when raised from said berth, the forward upright of the frame comprising a flange substantially coplanar with the inner side thereof to cooperate with the inner face of the window and a flange cooperating with the outer face of the window, said upright closing directly against said post and a covering of sheet metal comprising forward, rear and top portions lying in a surface which is substantially a continuation of the outer face of the door body, said rear and top portions overlying the corresponding portions of said frame and said forward portion lying exteriorly of said upright and having a flange lying inwardly of the line of sight and extending inwardly and rearwardly substantially to the rear edge of said outer flange.

8. A vehicle of the closed type having an enclosed driver's seat and comprising a lower body section having a door opening providing access to said seat and a fixed upper section including a top-supporting post rising adjacent the cowl at the forward side of said opening, a door of the type having a sliding window and comprising a lower door body received in said opening and providing within the same a berth for the window in lowered position and an upper portion above the belt line forming a fixedly projecting window frame into which the window slides when raised from said berth, said body comprising pillars at the sides and a connecting panel, one of said pillars terminating substantially at the belt line, the corresponding upright of said frame closing against said post and comprising a channeled member rising from said pillar which is of a thickness closely adapting it to the thickness of the window and of restricted dimension fore and aft and a covering of sheet material having forward, rear and top portions lying in a surface which is substantially a continuation of the outer face of said lower door body, said rear and top overlying the corresponding elements of said frame and said forward portion lying outwardly of said member and having a flange extending from its rear edge substantially to the rear edge of the outer flange of the same and lying inwardly of the line of sight and extending between the forward edge of said portion to the web of the channel.

9. A vehicle of the closed type having an enclosed driver's seat and comprising a lower body section having a door opening providing access to said seat and a fixed upper section comprising a top-supporting post rising adjacent the cowl at the forward side of said opening having an inner stop flange and having its outer rear corner rounded off, a door of the type having a sliding window and comprising a lower door body received in said opening and providing within the same a berth for the window in lowered position and a fixedly projecting window frame into which the window slides when raised from said berth, the forward upright of the frame comprising an inner flange to cooperate with the inner face of the window which closes against the stop flange of the post, an outer flange cooperating with the outer face of the window and part outward of said second flange extending to a surface constituting substantially a continuation of the lower face of the door body and having an inner face embracing the outer rear corner of the post and an outer face extending substantially from the rear edge of said outer flange and lying inwardly of the line of sight past the same.

10. A vehicle of the closed type having an enclosed driver's seat and comprising a lower body section having a door opening providing access to said seat and a fixed upper section comprising a top-supporting post rising adjacent the cowl at the forward side of said opening having an inner stop flange and having its outer rear corner rounded off, a door of the type having a sliding window and comprising a lower door body received in said opening and providing within the same a berth for the window in lowered position and a fixedly projecting window frame into which the window slides when raised from said berth, the forward upright of the frame comprising an inner flange to cooperate with the inner face of the window which closes against the stop flange of the post, an outer flange cooperating with the outer face of the window and part outward of said second flange and having an inner face embracing the outer rear corner of the post and an outer face extending substantially from the rear edge of said outer flange and lying inwardly of the line of sight past the same, the arris or intersection of said faces being aligned with the forward edge of the lower door body.

In testimony whereof, I have signed my name to this specification.

ALPHONSO S. CAMPBELL.